(12) United States Patent
Breuer et al.

(10) Patent No.: US 11,051,243 B2
(45) Date of Patent: Jun. 29, 2021

(54) USER EQUIPMENT FOR SEARCHING A SUITABLE BASE STATION

(71) Applicant: GEMALTO M2M GMBH, Munich (DE)

(72) Inventors: Volker Breuer, Boetzow (DE); Jürgen Gröne, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/482,091

(22) PCT Filed: Jan. 31, 2018

(86) PCT No.: PCT/EP2018/052329
§ 371 (c)(1),
(2) Date: Jul. 30, 2019

(87) PCT Pub. No.: WO2018/141761
PCT Pub. Date: Aug. 9, 2018

(65) Prior Publication Data
US 2020/0187111 A1     Jun. 11, 2020

(30) Foreign Application Priority Data
Jan. 31, 2017   (EP) .................................. 17154027

(51) Int. Cl.
*H04W 48/20* (2009.01)
*H04W 48/16* (2009.01)
(Continued)

(52) U.S. Cl.
CPC ............. *H04W 48/20* (2013.01); *H04W 8/18* (2013.01); *H04W 24/08* (2013.01); *H04W 48/16* (2013.01); *H04W 48/18* (2013.01)

(58) Field of Classification Search
CPC .............................. H04W 48/20; H04W 48/16
(Continued)

(56) References Cited

U.S. PATENT DOCUMENTS

2007/0274275 A1* 11/2007 Laroia ................. H04W 40/244
                                                                 370/338
2014/0099935 A1    4/2014 Han et al.
(Continued)

FOREIGN PATENT DOCUMENTS

EP          2840839 A1     2/2015

OTHER PUBLICATIONS

Ericsson, "Higher data rates for MTC", Mobile Competence Centre, France, vol. RAN WG2, Nov. 13, 2016, pp. 1-5.
(Continued)

*Primary Examiner* — Angel T Brockman
(74) *Attorney, Agent, or Firm* — Buchanan Ingersoll & Rooney PC

(57) ABSTRACT

The present invention relates to a user equipment configured to operate in a cellular network comprising a plurality of base stations, the user equipment comprising a communication unit and a control unit, wherein the communication unit is capable of operating in a specialized transmission mode with one of the plurality of base stations being capable of supporting said specialized transmission mode, in case of detection of a suitable base station, the communication unit is configured when operating in non-registered mode to: —decode an information signal received from said detected base station, the information signal indicating if said base station supports said specialized transmission mode, —camp on said base station, if said specialized transmission mode is supported, or —otherwise provide a message indicating non-support of specialized transmission mode support to the control unit.

14 Claims, 4 Drawing Sheets

(51) Int. Cl.
*H04W 24/08* (2009.01)
*H04W 8/18* (2009.01)
*H04W 48/18* (2009.01)

(58) Field of Classification Search
USPC .......................................................... 370/329
See application file for complete search history.

(56) References Cited

U.S. PATENT DOCUMENTS

2014/0315577 A1 10/2014 Yokoyama
2016/0212663 A1 7/2016 Uemura et al.
2016/0353342 A1 12/2016 Futaki

OTHER PUBLICATIONS

International Search Report (PCT/ISA/210) dated Mar. 2, 2018, by the European Patent Office as the International Searching Authority for International Application No. PCT/EP2018/052329.
RAN2, "Response LS on Enhanced Coverage authorization impact on cell and PLMN selection procedures", vol. SA WG2, Nov. 21, 2016, pp. 1-2.
Written Opinion (PCT/ISA/237) dated Mar. 2, 2018, by the European Patent Office as the International Searching Authority for International Application No. PCT/EP2018/052329.

* cited by examiner

USER EQUIPMENT FOR SEARCHING A SUITABLE BASE STATION

FIELD OF THE INVENTION

The present invention relates to a user equipment configured to search a suitable base station of a cellular network.

The invention also pertains to a method for said user equipment.

BACKGROUND OF THE INVENTION

Generally, in the field of wireless cellular communication with the upcoming importance of user equipments operating in the so-called "internet of things" (IoT), different capabilities from cellular networks and user equipments are expected and under definition. For the current technology standard LTE (long term evolution/4G) the release 14 definitions already comprise the new standard variants of Cat-M (category for machine type communication MTC) and NB-IoT (Narrowband-IoT). For future releases resp. 5G more and other technology standard variants like URLLC (ultra-reliable low latency communication) are already available.

Up to now the expectation by the user equipment users was, that when the radio access network of a specific technology standard is available, that the user equipment is able to camp on each base station resp. eNodeB of the radio access network. Especially for LTE Cat-M (Cat-M1 in Rel.-13 or in addition Cat-M2 in Rel.-14) it will be no more the case that the technology or its enhancement is backward compatible, means if a base stations resp. eNodeB supports only LTE even in Rel.-14 but not the additions required for Cat-M, such a user equipment will detect the eNodeB but will not be able to register or camp on it, as mandatory information are missing.

In addition it needs to be expected that a full coverage of the whole network area of a cellular network with base stations supporting all variants will hardly be achieved. This is an issue for the network operators. But it is also an issue for the user equipment, as by now the availability of a suitable base station for a supported technology standard meant, that it was generally possible to operate with such base station of the home cellular network. Suitability in that sense means fulfilling at the receiver side the defined suitability criteria, including that the cell is not barred, the user equipments subscription allows access and the cell selection criteria are fulfilled. The known procedures for selecting/re-selecting a base station are based on this precondition.

Further such situation may not only relate to technology standard variants but also to certain modes or other optional capabilities of the base station.

With the described development there is a need for more advanced selection/reselection procedures, which avoids the situation that a user equipment is camping on a base station according to the suitability criteria but is not able to operate in the respective variant. This may apply both to user equipments that are only capable of operating in said respective variants, like a low-cost device operating only in NB-IoT, and those user equipment which is capable of operating in many variants, but one envisaged variant is not available at the selected base station. The variants relate to specialized transmission modes of the base stations.

In addition some of the used specialized transmission modes/technology are very resource consuming. Hence it requires means that a base station supporting a certain specialized transmission mode may limit the support of said extreme resource consumptive features which also leads to the user equipment not being able to communicate. Furthermore also the user equipment may have an authorization restriction for said feature, i.e. only be allowed to use it to a certain degree. All these points may lead to confusion for the user having no clear indication why the user equipment is not camping on a base station and communicating as expected.

A user equipment supporting only a special variant of a base technology (such as Cat-M of LTE) may not being able to work in a certain coverage area whilst another user equipment nearby supporting LTE in general is able to camp and communicate, which may cause confusion for the end-user. The end-user is not aware whether the variant is not supported or a certain feature which would be required is not supported by the cellular network up to the needed level or the subscription to use such a feature is not sufficiently authorized.

It is therefore the goal of present invention to overcome the mentioned disadvantages and to propose a solution for an improved selection resp. reselection of a suitable base station. It is a further goal to suggest an indication mechanism which allows the user to identify the root-cause of not being able to communicate in a cellular network and hence overcome related issues. Further alternative and advantageous solutions would, accordingly, be desirable in the art.

SUMMARY OF THE INVENTION

For this it is according to a first aspect of the invention suggested a user equipment according to claim 1. It is further suggested according to a second aspect of the invention a method for a user equipment according to claim 11. According to the first aspect of the invention it is proposed a user equipment to operate in a cellular network (CLN) comprising a plurality of base stations (BS1, BS2), and further configured to carry out at least one predefined service, the user equipment comprising a communication unit (CMU) (module) and a control unit (CTU), wherein the communication unit is capable of operating in a specialized transmission mode with one of the plurality of base stations being capable of supporting said specialized transmission mode, in case of detection of a suitable base station, the communication unit (CMU) is configured when operating in non-registered mode to:

decode an information signal received from said detected base station, the information signal indicating if said base station supports said specialized transmission mode, and determine from said signals a qualification relating to the specialized transmission mode supported by the base station, camp on said base station, if said specialized transmission mode is supported, wherein supporting the specialized transmission mode further comprises support of said predefined service by evaluating if said qualification of the specialized transmission mode is supportive of said predefined service, or otherwise provide a message indicating non-support of specialized transmission mode support to the control unit (CTU).

The cellular network is preferably supporting technology standards including present 4G standard, and beyond. The cellular network comprises at least one base station, for 4G/5G networks such base station is called eNodeB. The base station represents the air interface to the user equipment situated in the cell area covered by said base station. Each base station is configured to signal on at least one frequency band for downlink communication.

The user equipment according to the invention comprises processing circuitry, volatile and permanent memory and transceiver circuitry. The user equipment includes a communication unit comprising the transceiver circuitry and preferably a separate processor for handling the tasks relating to the wireless communication with a base station. The user equipment further includes a control unit, typically incorporating further processing circuitry and the operating computer software, preferably stored in the permanent memory. Said user equipment is in particular a machine type communication (MTC) device.

Preferably the control unit and the communication unit interact via a call interface, e.g. the known AT interface or a functional interface, e.g. implemented with Java.

The user equipment is configured by means of the processing circuitry, transceiver circuitry and/or memory to operate in a connection session for setting up a communication link to a remote terminal with a base station.

According to the invention the user equipment is configured to operate in a specialized transmission mode. Said specialized transmission mode relates to an optimization on the air interface leading to different behavior compared to the common operation with the base station.

In particular it is suggested the specialized transmission mode comprises at least one out of the group of:
  LTE-Cat-M,
  LTE-Cat-M1,
  LTE-Cat-M2,
  LTE-Cat-1,
  Narrowband-IoT,
  NB1,
  NB2,
  Ultra-reliable low latency communication,
  High data throughput mode,
  massive machine type communication.

The suggested specialized transmission modes according to this embodiment relate to variants of technology standards 4G (LTE-Cat-M/1, NB-IoT (Narrowband-IoT), and 5G. Further modifications of capabilities relating to the technology variants are also foreseen as additional specialized transmission modes.

The user equipment is according to one embodiment only able to operate in said specialized transmission mode. According to another preferred embodiment the user equipment could operate in more than one specialized transmission modes, preferably including a common transmission mode, but prefers to operate in the non-common specialized transmission mode, e.g. due to power consumption, or subscription related reasons.

The invention applies to the user equipment operating in non-registered mode, e.g. after starting up the user equipment. Then the user equipment by means of the communication unit preferably scans the supported frequency bands and checks if a suitable base station is detectable.

Suitability means fulfilling at the receiver side of the user equipment the defined suitability criteria, that is the cell is not barred, the user equipments subscription allows access and the cell selection criteria are fulfilled, wherein the $S_{rxlev}>0$ and the $S_{qual}>0$, with $S_{rxlev}$ is the cell selection RX level value (in dB), and $S_{qual}$ is the cell selection quality value (in dB). More details can be found in 3GPP TS 36.304 Rel. 13.4, Section 5.2.3.2.

The suitability criteria are applied for cell selection with respect to the specialized transmission mode the user equipment intends to operate in. In one option the user equipment evaluates the found suitable base station directly when it is detected. Alternatively first the frequency scan is concluded, and then a list of detected suitable base stations is evaluated. Preferably one base station is evaluated at a time.

Then the communication unit tries to decode information signals sent from the detected base station. Preferably such information signals are broadcasted, in particular in a broadcast channel (BCH), e.g. as part of the master information block (MIB).

It is to be assumed when the base station is found as suitable, that the broadcast channel is successfully decoded. As the broadcast is repeated, the communication unit preferably tries to decode that often as needed for successfully decoding the broadcast channel.

Then the received information signals are evaluated relating to the presence of an indication that acknowledge, that the base station is supporting the specialized transmission mode.

If this is the case the base station is configured to camp on said detected base station. For that additional data signals are exchanged between the base station and the user equipment.

For the case that no such indication is found then the communication unit is configured to provide a message to the control unit, indicating that the specialized transmission mode is not supported. Preferably such indication is carried out by means of an asynchronous event submission mechanism, e.g. on the AT interface an unsolicited resource code (URC).

According to a preferred embodiment it is suggested that the message to the control unit comprises information relating to at least one out of the group of:
  existence of specialized transmission mode,
  required qualification of specialized transmission mode,
  insufficient subscription relating to specialized transmission mode.

With such information as part of the message from the communication unit, the control unit is in the position to provide a meaningful message to the user of the user equipment.

Additionally it is suggested that the user equipment is configured to provide said message in case no suitable base station is detected that supports the specialized transmission mode.

This embodiment is preferred when all found suitable base stations turn out to be not supportive of the specialized transmission mode.

With that information the user has the information that—despite availability of suitable base stations—the user equipment cannot camp at the current location on one of them. This is in particular advantageous when in parallel mobile handsets of the device technician are successfully operating in the cellular network. This is especially helpful when a semi-static user equipment operates within a certain coverage area, and in one part no coverage is found, whilst in other areas coverage can be found. With the message of this embodiment the user is informed about moving to said other areas with coverage.

According to another embodiment it is further suggested that the user equipment is configured to operate on at least one user profile with the cellular network, and after said camping on the base station, further configured to,
  determine from signals received from the base station a qualification relating to the specialized transmission mode supported by the base station,
  evaluate if the qualification complies with user equipments requirements, in case of non-compliance, initiate at least one out of the group of:

carrying out a cell-reselection, providing message indicating lack of qualification to the control unit, and adapting the user profile.

With this embodiment a second check is introduced when the user equipment already camps on the base station. This is advantageous as when a user equipment is camping on a base station, it is able to retrieve additional information relating to the capabilities of the base station.

According to this embodiment the user equipment is assessing a qualification level that the base station is intended to support for said specialized transmission mode and only camps on a base station, after identifying that the base station supports the specialized transmission mode as such and the required features up to the extent required by the user equipment.

Hence, after identifying that the base station supports the specialized transmission mode it evaluates to what extend the feature would be required based on measurements and compares said result to its authorization level. There is a related CE level authorization being part of the user profile to prevent a user equipment from consuming more resources then it is entitled for when changing from inactive to active. As a consequence the user equipment cannot set up an active communication and hence has no needs to camp on the cell as it cannot be used for communication.

Consequently the user equipment retrieves signals from the base station regarding a qualification of said specialized transmission mode supported by said base station.

Such qualification may in particular relate to the supported enhanced coverage mode of the base station. If the user equipment needs a higher enhanced coverage mode according to the user profile, then this could lead to prevention of connection setup.

Additionally the measured enhanced coverage level may be taken into account. This is advantageous as the communication during camping resp. registration and exchange of capabilities all relates to permanently repeated information. Hence, the user equipment may be able to decode the broadcasted signals after a couple of repetitions, although the base station as such is not able to support the enhanced coverage level for dedicated channels.

When the qualification of the specialized transmission mode is determined, it is evaluated in comparison to the user equipment requirements. When the qualification complies, that user equipment can carry on operating with the base station.

In addition there are also specialized transmission modes which have a relation in between, which is another exemplifying embodiment of said qualification of specialized transmission modes. I.e. Cat-M2 has a larger bandwidth than Cat-M1 but user equipments supporting Cat-M1 or M2 are also not able to camp on pure LTE cells. However a user equipment supporting Cat-M2 is able to camp on cells supporting only Cat-M1 and operate there with degraded or limited performance. This type of hierarchical relationship may apply to other specialized transmission modes as well, with a more restrictive and a less restrictive specialized transmission mode. Equally this applies to the suggested specialized transmission modes NB1 and NB1. Besides bandwidth also the number of parallel supported data streams i.e. number of HARQ process may differ also resulting in different performance and hence the number of different parallel received streams. In general any configuration or capability leaving to an increased or decreased support of a specific service or of the data throughput in general is of interest here.

In that respect the user equipment can setup communication with the base station supporting the more restrictive transmission mode, but not for all services. In above embodiment Cat-M1 does not support VoLTE under all circumstances due to insufficient resources when being close to cell border whilst Cat-M2 has the required capabilities. As Cat-M1 is the fallback from Cat-M2 the user equipment will camp on a base station supporting only Cat-M1, but the user may face service restrictions he is not aware of. Hence the user needs to have the corresponding indication that the current base station does not fulfill all requested qualifications of the less restrictive specialized transmission mode. If said qualification is needed the user equipment may react accordingly, otherwise it may stay on said base station supporting only the more restrictive specialized transmission mode. If not, it is preferred to carry out a cell-reselection in order to change to a new base station, if available, that complies with the qualification requirements of the user equipment, means, it supports the less restrictive specialized transmission mode and is able to carry out the requested qualification.

Alternatively or additionally it is preferable that the communication unit provides a message to the control unit indicating the lack of qualification of the current base station.

Further it is suggested to adapt the user profile in case insufficient authorization is the problem cause. This is in particular advantageous when the qualification of the specialized transmission mode is only closely missed and for a stationary user equipment no better base station is in reach. In this case it has turned out to be advantageous to operate with an adapted user profile, e.g. with shorter lifetime due to power constraints, than not at all.

The qualification of the specialized transmission mode is in particular specified by the HLR of the cellular network, that is the subscription relating to the user equipment.

Preferably it is suggested to store an indication of said base station in the user equipment, when it was determined that it is not compliant with the requested qualifications. Hence the base station can be filtered out already before camping on it. This is preferably already useful when directly a cell-reselection is carried out after detecting the non-compliance.

According to another preferred embodiment it is suggested that the user equipment further configured to carry out a predefined service, wherein supporting the specialized transmission mode further comprises support of said predefined service.

With this preferred embodiment it is introduced as part of the definition of a specialized transmission mode additional the capability to support a predefined service. That predefined service is preferably a mode of operation of the specialized transmission mode which impacts the way data transmission on the air interface between the base station and the user equipment. Such service may comprise Voice over LTE (VoLTE), data transmission, streaming etc.

Hence, based on signals received from the base station either before camping on the base station or thereafter, the user equipment gets an indication about the availability of the respective service, and if so, the base station is accepted as supporting the respective specialized transmission mode According to one preferred embodiment the predefined service relates to operating in enhanced coverage within a predetermined enhanced coverage level.

The enhanced coverage mode relates to a means of data exchange where in bad coverage conditions the signals are repeatedly transmitted until enough power is aggregated for reliably decoding the signals. It is known that base stations provide an enhanced coverage level, wherein the levels relate to the number of repetitions needed for reliable decoding. In addition the suitability of the base station is in case of enhanced coverage operation revised.

A service like VoLTE will—if at all—for the specialized transmission mode Cat-M1 only be supported to very low number of coverage enhancement repetitions as due to limited bandwidth and repetitions the required transport is otherwise not achieved. Compared to that Cat-M2 has a 4 times larger bandwidth. Hence it can transport more information in parallel and hence still ensure sufficiently good voice quality also for higher or same number of repetitions. Depending on the predefined service, like VoLTE, it is hence depending on the enhanced coverage level and the specialized transmission mode, if the predefined service can be fulfilled.

On the other hand reading and/or transmitting data repeatedly requires additional power, whereby a user equipment might have as requirements for operating a power budget for a defined set of data transmissions. When then there is a maximum of repetitions allowed for data exchange with the base station, according to said embodiment the predefined power consumption threshold might be exceeded.

Hence, when the base station is able to support a low-cost LTE variant like NB-IoT, as requested by the user equipment, it might still be not sufficient for camping on it, if it is not capable of providing a certain service, e.g. an enhanced coverage level below a given threshold.

This may be the case due to the support of different bandwidths e.g. in Cat-M1 only 1 resource block (1.4 MHz) is supported, whilst Cat-M2 supports a bandwidth of up to 5 MHz (4×6PRBs). If a Cat-M2 user equipment is on a base station with fallback to Cat-M1 some services may not work or only with degraded performance due to limited throughput.

Additionally, it is suggested according to another preferred embodiment that the user equipment is additionally configured to operate in a non-specialized transmission mode, and the user equipment is operating in a power saving mode, said power saving mode comprising a predefined power consumption threshold, wherein the user equipment is further configured to camp on said suitable base station not supporting the specialized transmission mode, under the condition that the predefined power consumption threshold is met by operating with said base station in non-specialized transmission mode.

This embodiment relates to a user equipment capable of supporting the common transmission mode, but prefers due to power constraints a specialized transmission mode relating to low cost user equipments. Should it however turn out, that the power consumption budget for a certain data transmission be sufficiently supported by the base station, then the user equipment is configured to continue operating with the base station. This is in particular detected after camping on the base station, in particular when no suitable base station was detected that supports the specialized transmission mode, moreover in the desired qualification and/or service type.

When a user equipment is preferably operating in a non-stationary mode, it is further advantageous to inform the cellular network about coverage holes in regards to the specialized transmission mode.

Hence it is suggested a user equipment further configured upon detection of no suitable base station supporting specialized transmission mode at the current location:
  to store an indication relating to said location,
  to submit said indication to the cellular network at a later point in time when the user equipment is camping on a serving base station.

For user equipment with this embodiment it is introduced the capability to detect the situation that at a certain location no coverage is detected regarding the specialized transmission mode. A moving user equipment at a later point in time when it is again able to operate on a base station supporting the desired specialized transmission mode, will therefore provide a message to the cellular network by using the then serving base station.

The location of the coverage hole is in particular depicted by an information relating to the identity of the best base station (e.g. cell-ID) which is not supportive of the specialized transmission mode or of the closest base station which was able to support said specialized transmission mode. Alternatively the synchronization sequence code used for synchronization of the user equipment on the base station is identified, which is typically unique among one of a plurality of areas comprised in a cellular network, or at least parts thereof. Alternatively a plurality of cell-ID or other base station identification codes are chosen relating to the base station before reaching the coverage hole and at least one after the coverage hole is passed.

The peculiarity of this embodiment is, that the user equipment sends by means of one serving base station measurement information relating to at least one other base station. Preferably this helps the cellular network operator optimizing its network coverage in regards to the specialized transmission mode.

It is further advantageous when the message to the serving base station additionally comprises information relating to the reasons for non-compliance of decodable base stations at the reported coverage hole. This might in particular relate to the suitability, the expected specialized transmission mode, and variants thereof, in particular relating to the qualification, in particular CE level, and service types.

In a further advantageous embodiment it is suggested a user equipment wherein said control unit is further configured to retrieve after said camping on the base station (BS1, BS2) an indication from the control unit to carry out another predefined service, and to instruct the communication unit to repeat the base station selection.

With this embodiment the control unit of the user equipment is put into the position to react on the information received from the communication unit.

Preferably the control unit receives the message indicating non-support of a respective specialized transmission mode by means of an URC.

The reaction of the control unit comprises at least one of the mentioned options. One of the options relates to adapt the requirements relating to base station capabilities. This is in particular the case for an increased enhanced coverage level. Preferably the launch of another predefined service is encompassed that may lead to a new base station selection, as the serving base station might not be supportive of the service in the current qualification. Other options are deprioritizing the current base station in the cell reselection and trying to camp on a base station being more suitable for the requirements/needs of the user equipment.

In case such adapted requirements are set, then the control unit additionally instructs the communication unit to repeat the search for base stations taking into account such adapted requirements.

This is advantageous as the control unit can decide about loosened requirements, that the communication unit from its perspective is unable to decide. Additionally the control unit can accept a user request, e.g. when achieving connectivity is higher rated than maintaining the requirements.

According to a second aspect of the invention it is suggested a method for a user equipment configured to operate in a cellular network (CLN), further configured to carry out at least one predefined service, the user equipment being capable of operating in a specialized transmission mode with one of a plurality of base stations (BS1, BS2) being part of the cellular network, the base station being capable of supporting said specialized transmission mode, the user equipment comprising a control unit (CTU), the method comprising the steps for a user equipment operating in non-registered mode of:

detecting of a suitable base station, decoding an information signal received from said detected base station, the information signal indicating if said base station supports said specialized transmission mode, determining from said signals a qualification relating to the specialized transmission mode supported by the base station, camping on said base station, if specialized transmission mode is supported, wherein supporting the specialized transmission mode further comprises support of said predefined service by evaluating if said qualification of the specialized transmission mode is supportive of said predefined service, or otherwise providing a message indicating lack of specialized transmission mode support to the control unit. The second aspect shares the advantages of the first aspect.

As it is shown this invention advantageously solves the depicted problem and provides the required indications for the end user to understand and cope with said situation or accept limited service capabilities.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE of the type to which the present invention is applied as an embodiment. The user equipment UE is configured to operate in a cellular network by accessing a base station of the cellular network.

The user equipment of this embodiment comprises a control unit CTU and a communication unit CMU.

The communication unit CMU comprises processor circuitry PC, like a CPU or other types of processors. The processor is configured to run computer programs which are stored in the memory M of the communication unit CMU. The processor is at least dedicated for controlling the transceiver circuitry TC. The transceiver circuitry comprises both receiver circuitry and transmitter circuitry for wireless communication with at least one base station of a cellular network. For this it additionally makes use of the antenna A. Preferably the communication unit is a wireless communication module.

The control unit CTU controls behaviour of the user equipment including the communication by means of the communication unit. Typically it also comprises processing circuitry for executing a control software stored in a permanent memory, or alternatively uses such components of the communication unit CMU.

The control unit preferably controls the communication unit by means of a command interface, like the standardized Hayes AT interface. Further the control unit cares for all user equipment relates issues, e.g. logic for measuring, user interface, accessing other communication means, like near field communication or wired connections, storage for user credentials/user profile including CE level authorization, i.e. the possibility to consume a feature of a restricted transmission mode up to a certain level.

Figure 1:
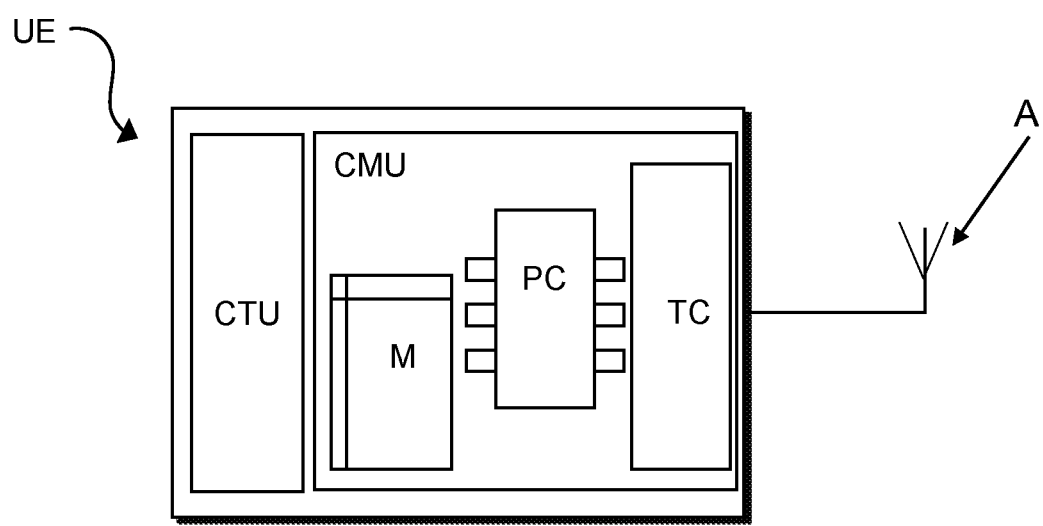
FIG. 1 represents a user equipment of the type to which the present invention is applied as an embodiment.
Figure 2:
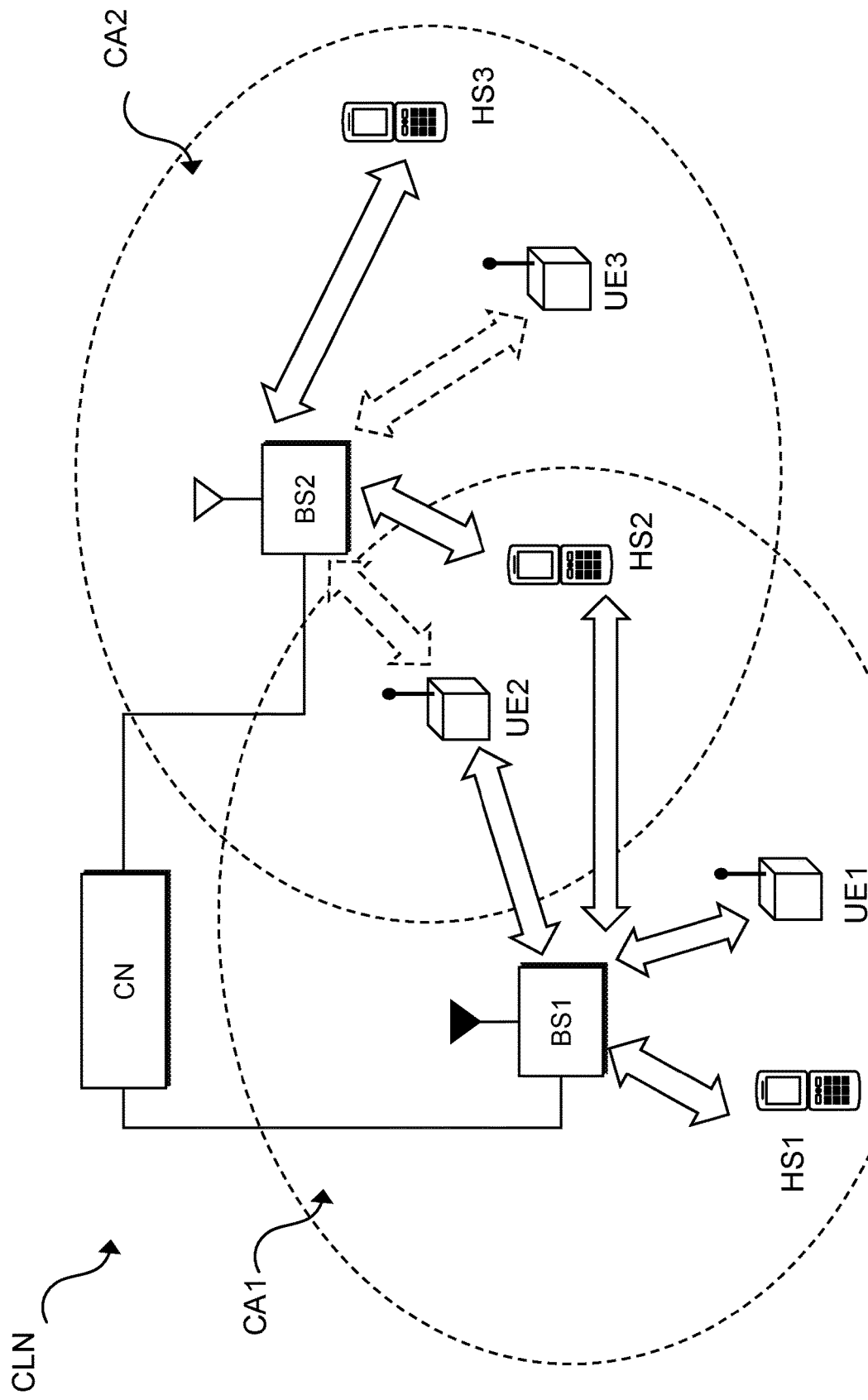
FIG. 2 represents a scenario of user equipments of the type to which the present invention is applied as an embodiment operating in a cellular network.

FIG. 2 schematically shows user equipments UE1, UE2, UE3 of the type to which the present invention is applied to as an embodiment. The user equipments are situated in the cell areas CA1, CA2 of two base stations BS1, BS2 of a cellular network CLN, resp. a radio access network of the cellular network.

The user equipments in this exemplifying embodiment are machine-type communication devices like metering devices, that are configured to conduct regularly an uplink and/or downlink communication of only a small amount of data. The user equipments are preferably low-cost devices, that means they are optimized for operating in a specialized transmission mode, in particular offered by the LTE variant Cat-M of a type including M1 or M2 or NB-IoT.

This LTE variant comprises—opposed to regular LTE—that the user equipment only needs to decode a part of the frequency band supported by the base station, in particular a subcarrier that is at least temporarily reserved for Cat-M user equipments. This allows that the user equipment has only sufficient processing power for decoding in one slot of 0.5 ms only one resource block. Such user equipments are classified as low-cost devices.

Such low-cost devices are however unable to operate with a LTE base station that does not support Cat-M, but only the regular common LTE service mode. In LTE base stations are called eNodeB.

The base stations BS1 and BS2 are part of the radio access network for LTE. Each eNodeB covers a spatial region of the coverage area, which is the cell area CA1, CA2, and is additionally connected directly or indirectly to components of the core network CN of the cellular network CLN. The dashed borders of the cell areas indicate the location where for a user equipment the respective eNodeB is suitable for camping. Technically speaking this also relates to the capabilities of the user equipment, in particular its transceiver circuitry and other environmental conditions, but for a model-like illustration this is sufficient.

The base stations BS1 and BS2 differ in its abilities. BS1 is capable of common LTE and additional specialized transmission modes, including Cat-M.

In contrast, base station BS2 is only capable of providing the common LTE service mode to the user equipments in its cell area CA2.

Additionally shown are mobile handsets HS1, HS2, HS3, representing user equipments for common human usage of cellular communication, e.g. for making common voice telephony and/or data connection for internet usage, streaming, chatting etc. Those mobile handsets are operating with base stations BS1, BS2 in common LTE service mode.

For registering at a base station each user equipment, including mobile handsets needs to scan the supported frequency band for suitable base stations and makes a list of such base stations. According to the known procedures the user equipment will initially select a base station and then re-select the best base station and then try to register starting with said base station providing the best signal strength.

In the exemplifying scenario shown in FIG. 2 it is assumed that the user equipment only detects the base station(s), in which cell area the user equipment is situated.

That means for user equipment UE1 and handset HS1 only base station BS1 is suitable. For user equipment UE2 and HS2 both base stations BS1 and BS2 are suitable. For user equipment UE3 and HS3 only base station BS2 is suitable from signal strength perspective.

With the arrows it is indicated which camping relationships are to be evaluated. For the arrows with a solid line it is possible that the respective user equipment can camp on the respective base station. With dashed arrows it is indicated if the camping is not possible, despite fulfilling suitability criteria. For all mobile handsets HS1, HS2, HS3 the camping is possible, as all base stations provide the common LTE service mode, the handsets are able to operate with.

Low cost user equipment UE1 is able to operate on base station BS1, as base station BS1 is able to provide the specialized transmission mode of Cat-M. Whereas user equipment UE3 is not able to operate on base station BS2, and hence is out of service.

For user equipment UE2 it is now to decide on which base station it tries to camp. From the signal strength order, indicated by the arrow length, base station BS2 would be better. But BS2 does not support Cat-M. The support of Cat-M can be identified by reading the MIB of a cell which—in case Cat-M is on supported carriers—comprises an indication where the M-SIB1 can be found containing the SIB scheduling information for Cat-M.

Said user equipment UE2 needs to finally camp on base station BS1 whilst a mobile handset nearby (here HS2) would without problems access base station BS2, which makes it for a technician that installs the user equipment UE2 more unclear what is going on.

In addition if also BS1 would not support Cat-M or be out-of-reach (like for user equipment UE3), the user equipment would not register at all. Hence, this may end up in a total unclear situation why a user equipment does not register, or registers on a base station which is more power consumptive than another base station, while a mobile handset HS2 behaves completely different.

The situation would even be more unclear if base station BS2 doesn't support the specialized transmission mode but base station BS1 does. However due to the increased distance either the base station BS1 does not provide the required CE level necessary due to increased distance or the user equipment does not have the needed CE authorization level.

For improving this behaviour the user equipment according to present invention is configured to be better indicative of its behavior and especially indicate why a registration does not happen. It is important to have a distinction of above mentioned cases, especially as to distinguish those from malfunctioning installations or devices.

According to the invention the user equipment is configured to decode information signals received from the candidate base stations from the suitable cell list, select a suitable base station or being indicative on base stations not supporting said transmission mode and exclude them accordingly.

In a preferred embodiment such information signals are broadcasted by the base station, in particular as part of the master information block MIB.

Figure 3B:
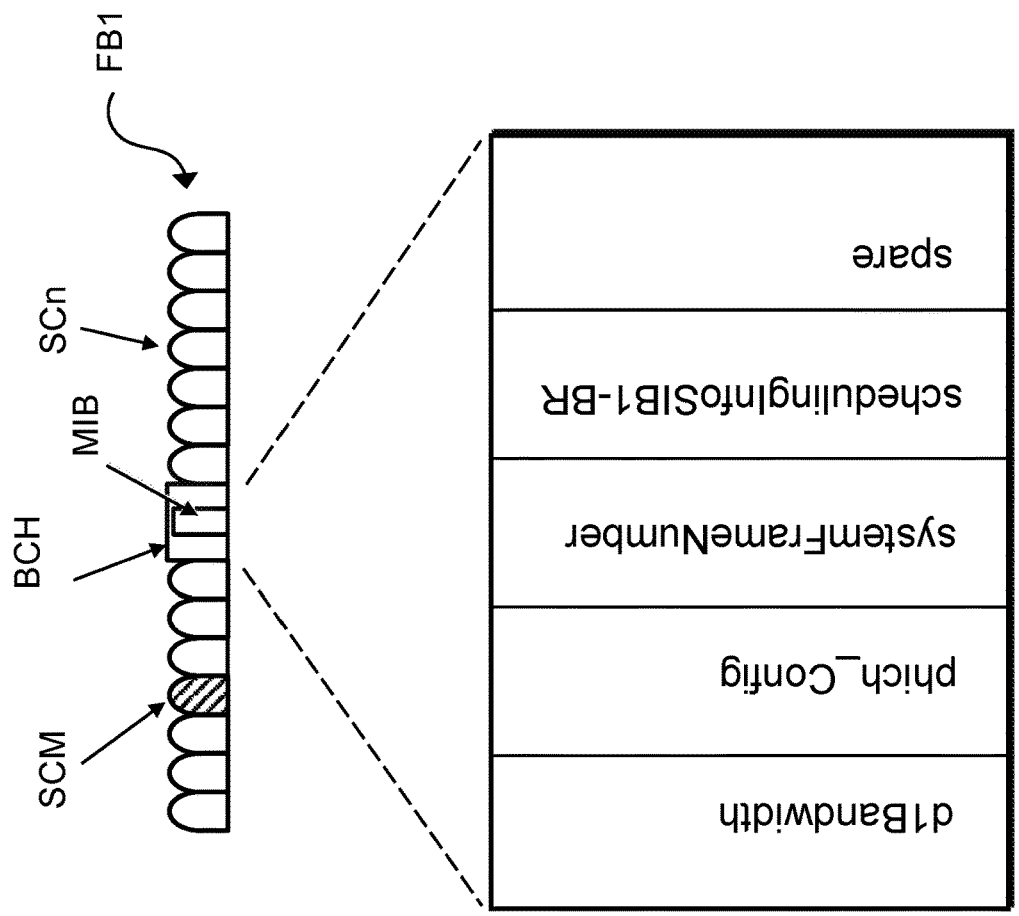
FIG. 3b represents details of the master information block broadcasted from a base station to a user equipment according to a preferred embodiment of present invention.
Figure 3A:
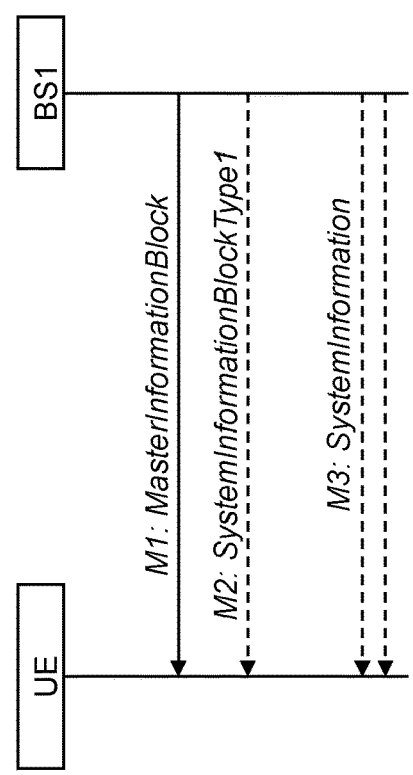
FIG. 3a shows the sequence diagram of broadcasting of information relating to a base station to a user equipment according to a preferred embodiment of present invention.

FIG. 3a shows such broadcasting procedure as indicated in 3GPP TS36.331 V13.2. According to this the user equipment UE receives unidirectional signals from the base station BS1. Here is shown the order of broadcast signals.

First broadcast message M1 comprises the master information block MIB. The second broadcast message M2 comprises the system information block type 1, this is the first system information block SIB1 for conventional LTE user equipments.

The remaining SIBs are sent in the messages M3. Then with the next radio frame the operation starts again.

FIG. 3b shows an exemplifying frequency band FB1 section provided by a base station. Typically an eNodeB is configured to provide a plurality of frequency bands FBx.

Each resource area SCn covers 6 resource block having a frequency width of 1.08 MHz (corresponding to an occupied bandwidth of 1.4 MHz for a standalone system) of the frequency band. In said area the SIB1-BR would be scheduled.

In the center located is the broadcast channel BCH where the master information block MIB is provided. For Cat-M at least one resource area SCM is reserved. This area containing the SIB1-BR is scheduled by the master information block. SIB1-BR contains all necessary information for receiving the further SIBx-BR elements. Related scheduling and also dedicated information scheduling may take place in any of the SCn areas being feasible by informing the user equipment sufficiently in advance on which SCn area the information is being received.

The master information blocks is according to the standard document cited above composed of a plurality of fields as shown below:

| MasterInformationBlock field descriptions |
| --- |
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| phich-Config |

| MasterInformationBlock field descriptions |
| --- |
| Specifies the PHICH configuration. If the UE is a BL UE or UE in CE, it shall ignore this field.<br>schedulingInfoSIB1-BR<br>This field contains an index to a table that defines SystemInformationBlockType1-BR scheduling information. The table is specified in TS 36.213 [23, Table 7.1.6-1 and Table 7.1.7.2.7-1]. Value 0 means that SystemInformationBlockType1-BR is not scheduled.<br>systemFrameNumber<br>Defines the 8 most significant bits of the SFN. As indicated in TS 36.211 [21, 6.6.1], the 2 least significant bits of the SFN are acquired implicitly in the P-BCH decoding, i.e. timing of 40 ms<br>P-BCH<br>TTI indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |

The schedulingInfoSIB1-BR is an information for scheduling of bandwidth-reduced. If no systeminformationBlock-Type1-BR is scheduled, that means no "bandwidth reduced", this means Cat-M is not supported by the respective base station.

Hence, message M1 shown in FIG. 3a comprises the most important information for Cat-M user equipments schedulingInfoSIB1-BR, i.e. where the device finds the SIB1-BR, means the SIB containing all SIB scheduling information for bandwidth reduced (BR) user equipments, that is user equipments including type Cat-M.

The SIB1-BR contains the remaining scheduling information of system information blocks related validity indications, and in particular barring indication and if a change of system information has happened since the last submission. Based on the presence of schedulingInfoSIB1-BR within the MIB for Cat-M (including Cat-M1 and Cat-M2) user equipments—means bandwidth reduced user equipment in general—it can be concluded whether said base station supports its required transmission mode or not.

Such indication is provided directly or indirectly, hence the user equipment is capable of figuring out before trying to camp on the base station, if the base station supports the respective specialized transmission mode. Otherwise the user equipment is not able to receive the required system information for camping.

For other specialized transmission modes such indications are foreseen or need to be defined in the coming standards.

Figure 4:
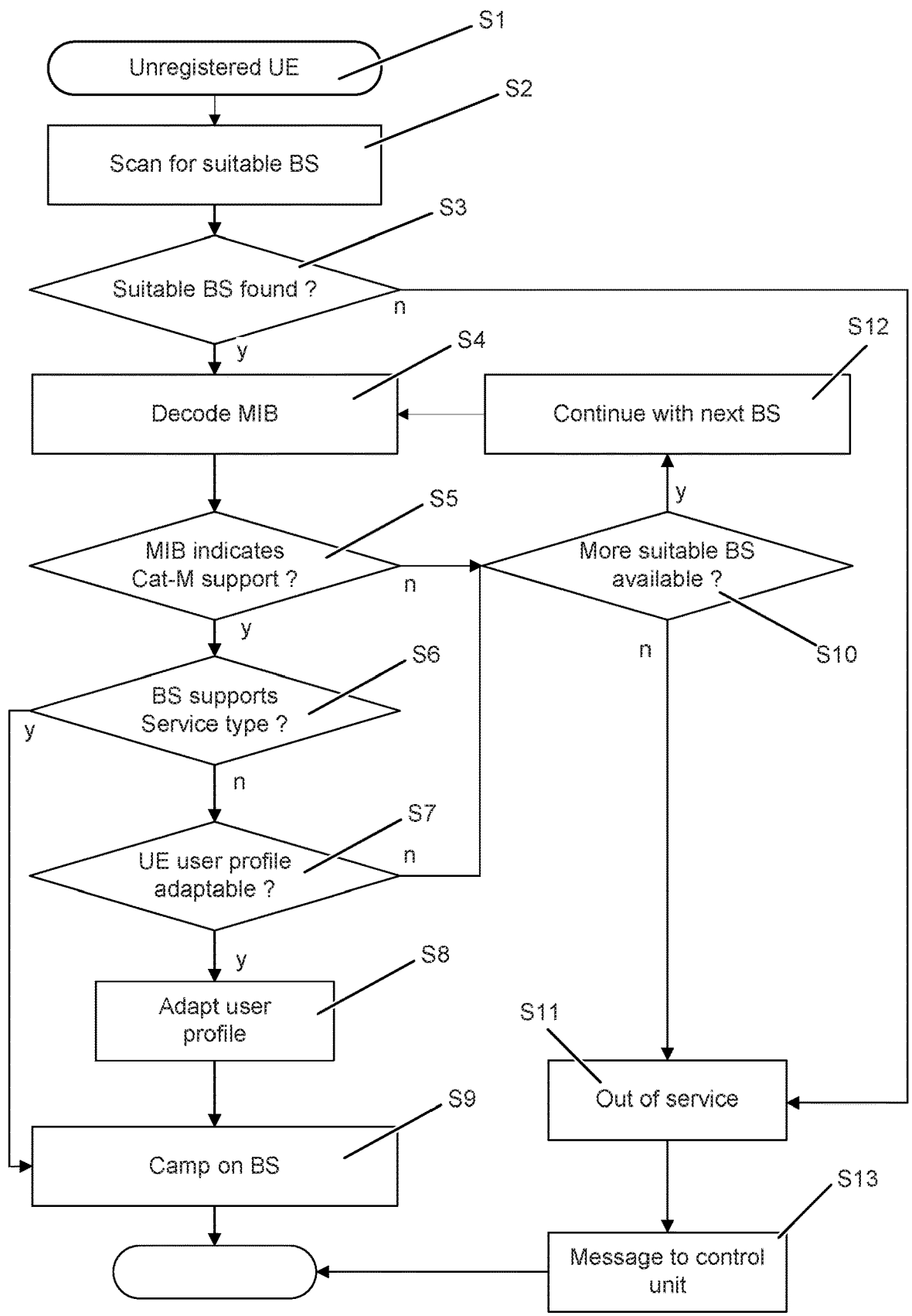
FIG. 4 shows a sequence diagram illustrating the procedure for selecting a base station by a user equipment according to a preferred embodiment of present invention.

FIG. 4 shows a flow chart of the base station acquisition procedure for a user equipment according to a preferred embodiment of present invention. The user equipment is a low-cost device, which is only operating in Cat-M. Hence it needs to find a base station supporting the related specialized transmission mode. In an alternative mode the user equipment may technically be capable of operating with a common base station, but out of other conditions, in particular power consumption prerequisites, it is not recommended to operate on such base stations.

The exemplifying process flow starts with step S1 of a user equipment operating in unregistered mode. This is in particular the case when the user equipment just starts, e.g. when it is installed in the field or restarted.

As every common user equipment the first thing for getting registered is to scan for suitable base stations, as indicated in step S2. The result is a list of base stations where signals could be achieved. Preferably that list is ordered by the signal strength.

In step S3 it is checked if at least one base station provides a signal strength value above the suitability threshold. If this is not the case, the user equipment is in an area with not sufficient coverage, and therefore out of service, as indicated by step S11. Preferably the operation could be restarted taking into account suitability relating to enhanced coverage. Additionally it is also encompassed in present invention according to another preferred embodiment to memorize an indication relating to the analyzed suitable base stations, which were not able to support the respective specialized transmission mode, and at a later point in time, when the user equipment managed to camp on a base station, e.g. at another location, provide the memorized information to the cellular network for the sake of closing coverage holes.

If the out of service situation is definitely found, then the process flow branches to step S13 where a message is submitted to the control unit of the user equipment. With that the user equipment is capable of making a meaningful message to the user by means of the user interface.

When a suitable base station is found concerning received signal strength the process flow branches to step S4. Here the information signals broadcasted by the base station are decoded. This in particular relates to the master information block MIB, which is preferably of the structure shown in FIG. 3b.

The user equipment then in steps S5 evaluates if the received MIB indicates that the base station supports Cat-M. As shown above, this is in particular the case when the field schedulingInfoSIB1-BR is populated. When this is not the case this shows that the examined base station is not capable of supporting Cat-M, hence the user equipment cannot operate with this base station. Hence the process flow branches to step S10, where it is checked if further suitable base stations are on the list, and if so continues with the next base station in the list, as shown in step S12.

If the base station is capable of supporting Cat-M, then it is preferably according to the exemplifying process flow further checked for the availability of another service type. Such service type in particular relates to capabilities like enhanced coverage or whether Cat-M1 or the more performing Cat-M2 is supported (providing wider bandwidth having higher transport capabilities) etc. When such capabilities of the base station are possible to evaluate before camping on the base station, it is preferred to carry out said check first, otherwise it would need to camp on the base station, and conduct further checks afterwards. This is preferably in particular for those requirements which are only identifiable when camping on a base station. As long as this is not necessary it is preferred and goal of present invention to avoid camping as long it is not sure that the user equipment can operate with the respective base station.

In the present embodiment the check relating to the respected service type is carried out in step S6. If the base station complies with this service type, then the process flow branches to step S9, that is the user equipment camps on the base station. The service type may rely according to an exemplifying embodiment to voice services, in particular VoLTE, and/or streaming, or normal IP based data transmission.

Otherwise, when the service type is not supported there is another preferred possibility of checking if the user profile of the user equipment may be adapted. As an example in case that is evaluated that the base station supports Cat-M and also the required number of repetitions corresponding to the measured signal strength the user equipment checks whether its currently used user profile has also the allowance/authorization for said level of coverage enhancement.

If the user profile may not be adapted then the process flow branches to step S10, where the next base station is picked again.

Otherwise in step S8 the user profile is adapted in order to comply with the capabilities of the base station. Then the user equipment camps on the base station in step S9.

For the sake of simplification, it is not shown in this flow chart the negotiation of the user equipment with the identified base station if it is eligible to access the base station, in particular if it is the home network, or it is allowed to roam in the respective cellular network. This has to be executed before successfully camping on the base station, and if not the process needs to branch to step S10 again.

With this exemplifying embodiment it is shown that the procedure of registration of a user equipment is only slightly enhanced but reliably leads to the user equipment camping on a base station, where it is able to operate with.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. User equipment configured to operate in a cellular network comprising a plurality of base stations, and further configured to carry out at least one predefined service,
the user equipment comprising a communication unit and a control unit,
wherein the communication unit is capable of operating in a specialized transmission mode with one of the plurality of base stations being capable of supporting said specialized transmission mode, wherein the specialized transmission mode is different from an enhanced coverage mode,
in case of detection of a suitable base station, the communication unit is configured when operating in non-registered mode to:
decode an information signal received from said detected base station,
determine from the decoded information signal whether said base station supports said specialized transmission mode,
in response to determining that the specialized transmission mode is supported, determine whether the specialized transmission mode for the base station supports the predefined service,
in response to determining that the specialized transmission mode for the base station is supportive of said predefined service, camp on said base station, and
in response to determining that the base station does not support the specialized transmission mode or the specialized transmission mode for the base station does not support the predefined service, provide a message indicating non-support of specialized transmission mode support to the control unit.

2. User equipment according to claim 1,
further configured to retrieve after said camping on the base station an indication from the control unit to carry out another predefined service, and to instruct the communication unit to repeat the base station selection.

3. User equipment according to claim 1,
wherein the message to the control unit comprises information relating to at least one out of the group of:
existence of the specialized transmission mode,
required qualification of the specialized transmission mode,
insufficient subscription relating to the specialized transmission mode.

4. User equipment according to claim 1,
configured to provide said message in case no suitable base station is detected that supports the specialized transmission mode.

5. User equipment according to claim 1,
wherein the predefined service relates to at least one of a voice telephony, data transmission or streaming.

6. User equipment according to claim 1,
wherein the user equipment is additionally configured to operate in a non-specialized transmission mode, and the user equipment is operating in a power saving mode, said power saving mode comprising a predefined power consumption threshold,
wherein the user equipment is further configured to camp on said suitable base station not supporting the specialized transmission mode, under the condition that the predefined power consumption threshold is met by operating with said base station in non-specialized transmission mode.

7. User equipment according to claim 1,
further configured upon detection of no suitable base station supporting the specialized transmission mode at a particular location:
to store an indication relating to said particular location,
to submit said particular indication to the cellular network at a later point in time when the user equipment is camping on a serving base station.

8. User equipment according to claim 1,
wherein the specialized transmission mode comprises at least one out of the group of:
LTE-Cat-M,
LTE-Cat-M1,
LTE-Cat-M2,
Narrowband-IoT,
NB1,
NB2, Ultra-reliable low latency communication,
High data throughput mode, and
massive machine type communication,
wherein the predefined service is the enhanced coverage mode.

9. User equipment according to claim 1,
wherein said control unit is further configured to receive said message indicating non-support of specialized transmission mode or lack of qualification,
in response to adapt requirements relating to base station capabilities,
to instruct communication unit to repeat base station selection.

10. Method for a user equipment configured to operate in a cellular network, further configured to carry out at least one predefined service,
the user equipment being capable of operating in a specialized transmission mode with one of a plurality of base stations being part of the cellular network, the base station being capable of supporting said specialized transmission mode, wherein the specialized transmission mode is different from an enhanced coverage mode,
the user equipment comprising a control unit,
the method comprising the steps for a user equipment operating in non-registered mode of:
detecting of a suitable base station,
decoding an information signal received from said detected base station,
determining from the decoded information signal whether said base station supports said specialized transmission mode,
in response to determining that the specialized transmission mode is supported, determine whether the specialized transmission mode for the base station supports the predefined service,
in response to determining that the specialized transmission mode for the base station is supportive of said predefined service, camp on said base station, and
in response to determining that the base station does not support the specialized transmission mode or the specialized transmission mode for the base station does not support the predefined service, providing a message indicating lack of specialized transmission mode support to the control unit.

11. Method according to claim 10,
comprising after camping on the base station, the step of retrieving an indication from control unit to carry out another predefined service,
and instructing the communication unit to repeat the base station selection.

12. Method according to claim 10,
wherein the message to the control unit comprises information relating to at least one out of the group of:
existence of the specialized transmission mode,
required qualification of the specialized transmission mode,
insufficient subscription relating to the specialized transmission mode.

13. Method according to claim 11,
wherein the predefined service relates to at least one of a voice telephony, data transmission or streaming.

14. Method according to claim 11,
further comprising upon detection of no suitable base station supporting the specialized transmission mode at a particular location the steps of:
storing an indication relating to said particular location,
submitting said particular indication to the cellular network at a later point in time when the user equipment is camping on a serving base station.

* * * * *